United States Patent Office 3,417,798
Patented Dec. 24, 1968

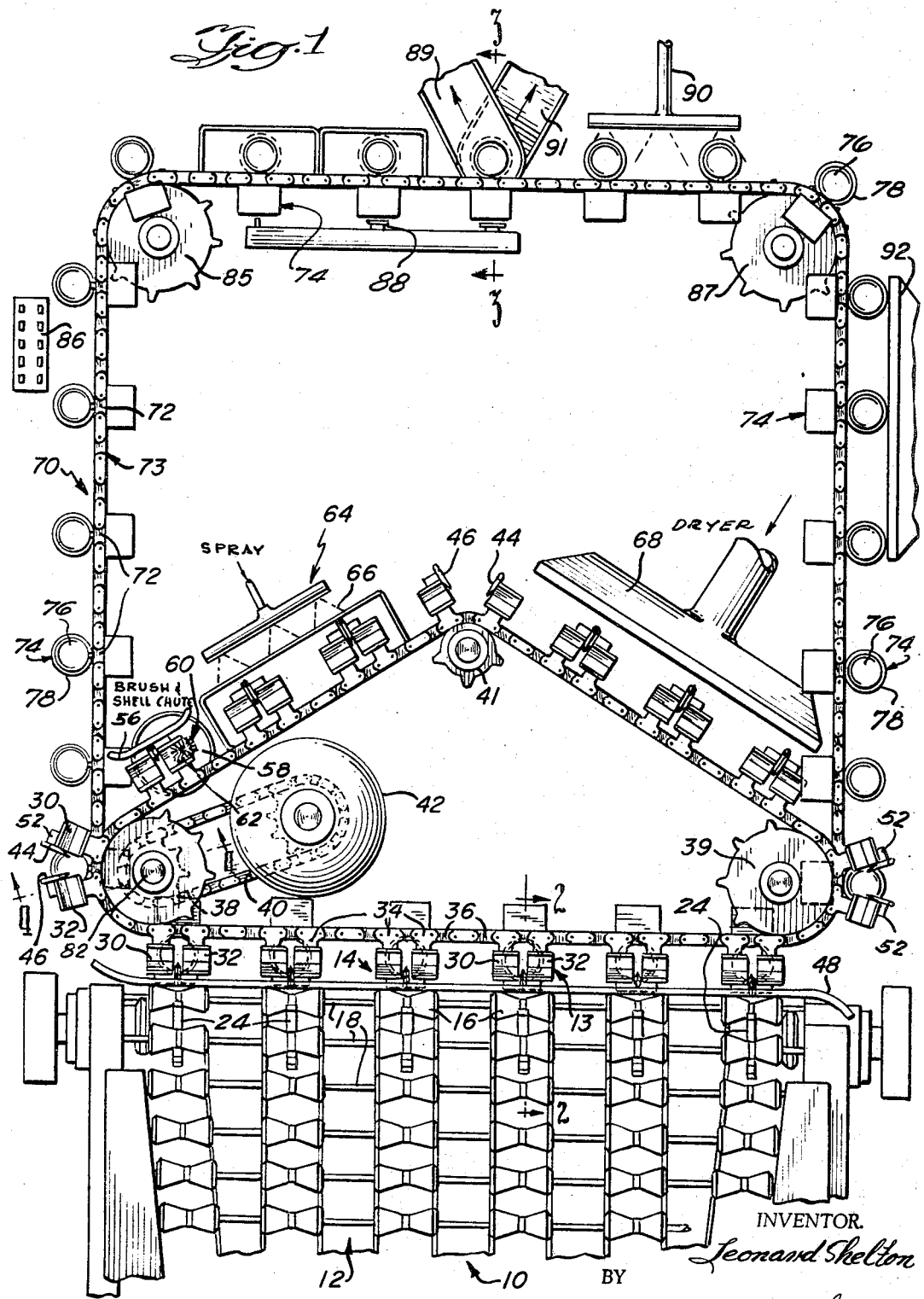

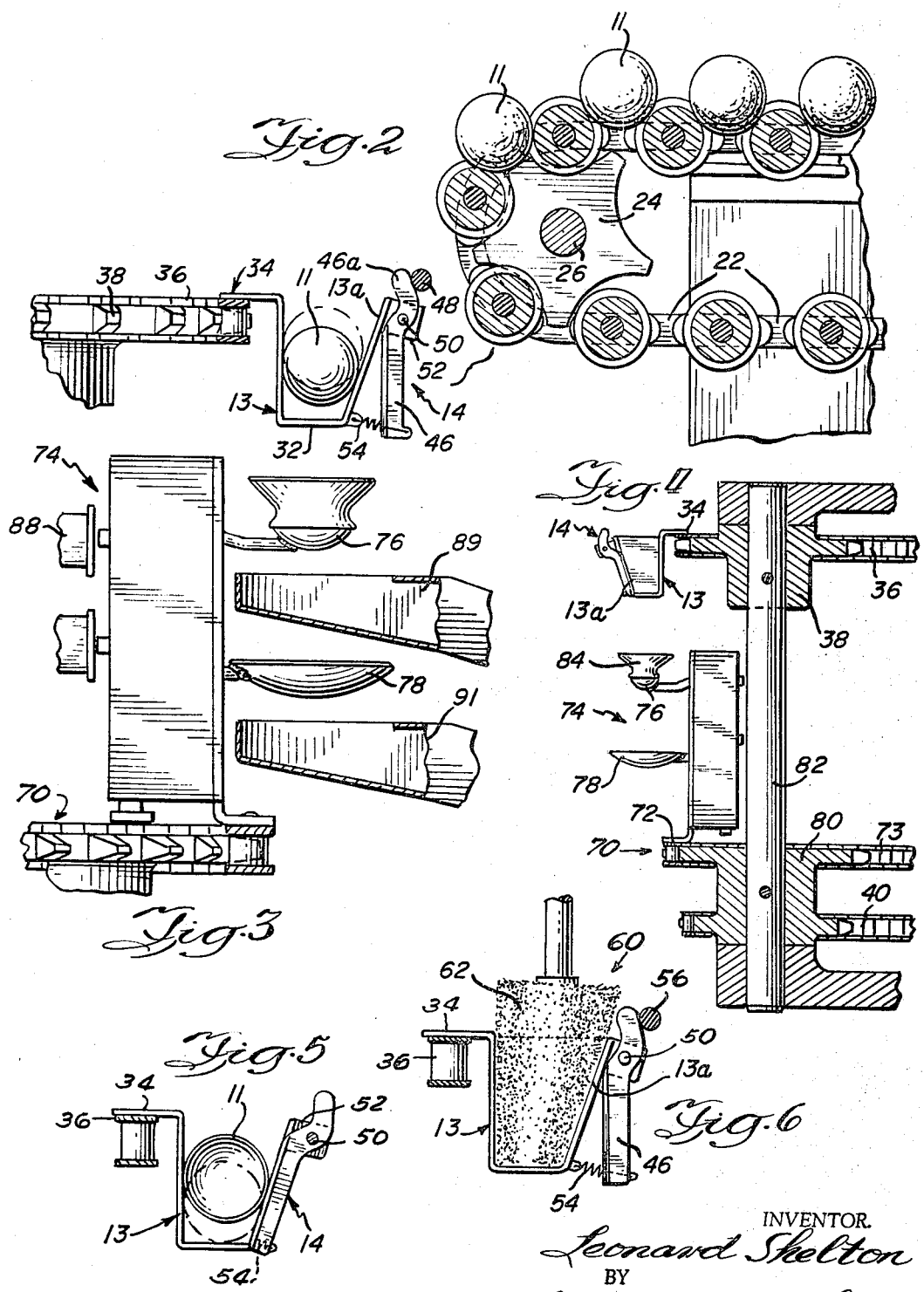

3,417,798
EGG BREAKING AND SEPARATING APPARATUS
Leonard Shelton, Omaha, Nebr., assignor to Continent Egg Corporation, a corporation of Illinois
Filed Sept. 2, 1966, Ser. No. 577,065
10 Claims. (Cl. 146—2)

This invention relates to apparatus for processing eggs and egg products and, particularly, to such an apparatus that is designed to receive shell eggs, break same and separate the egg products as desired. In addition, the machine is capable of selectively dumping and collecting the various egg products and for washing and sanitizing the apparatus used in accomplishing these ends.

It is recognized that there are currently on the market a variety of machines that, generally speaking, are capable of performing the functions of receiving an egg, breaking same, and separating and collecting the various egg products contained therein.

Heretofore, the currently available egg breaking and separating apparatus, while generally satisfactory, were subject to certain limitations. For example, the egg holding devices heretofore used have required a large number of interrelated parts to retain the egg in position prior to cracking and to subsequently effectuate satisfactory cracking and dumping of the contents disposed therein. In addition, there has been a definite limitation on the size of the eggs that can be handled by such apparatus and the speed and rate in which the eggs can be broken and the contents thereof separated and collected. Furthermore, the knife used for cutting the egg shells was generally positioned in the path of the egg products being dumped and tended to trap egg products, which wasted egg products and made cleaning more difficult.

In accordance with the present invention, there is provided an egg holding and separating apparatus which is quite simple in design, yet operates in a highly efficient manner. The novel egg breaking and separating apparatus disclosed herein essentially consists of two separate, but interrelated conveyor systems. On one conveyor are disposed a plurality of egg receiving and breaking units, and on the other there are located the egg yolk and egg white receiving cups. The separate conveyors are driven together in a synchronized relationship, so that the egg product receiving cups are positioned beneath the egg breaking heads when an egg disposed therein is broken and the contents emptied. With each of the conveyor systems are provided suitable washing and drying apparatus to maintain the desired cleanliness. Adjacent to a run of the conveyor containing the egg products are located suitable receptacles for receiving the egg contents from the cups. Selective dumping of the egg product holding cups is controlled by an operator-controlled selector mechanism.

The egg receiving and breaking apparatus is made of relatively few parts and is capable of handling eggs of various sizes and shapes. Additionally, the knife used for cutting the egg shells is so positioned relative to the egg receiving cups that it will not trap material in the egg cups. Furthermore, the conveyor system to which the egg breaking and receiving units are connected is designed so that the conveyor itself will serve to separate the cup halves, and thus no additional mechanism is required to accomplish this function.

The simplicity of the various features of the instant design greatly facilitates the cleaning thereof and in addition provides for an accurate apparatus that can be used in conjunction with a multiple egg feeding mechanism. That is to say that the novel apparatus illustrated and described herein is capable of receiving a plurality of eggs at a given time and is designed to handle large quantities of eggs within a relatively short time period. The disclosed apparatus utilizes a very simple link chain principle whereby accurate spacing is maintained throughout its travel. There is no likelihood of the spacing of the various breaking heads and collecting cups changing, which could, of course, effect the entire operation of the machine, since if the various heads and cups get out of time, accurate and complete collection of the egg products could not be obtained.

The structure by which the above and other advantages of the present invention are attained will be described in the following specification taken in conjunction with the accompanying drawings illustrating a preferred structural embodiment of the invention, in which:

FIGURE 1 is a plan view of the apparatus shown in position to receive whole eggs from an egg washing and candling mechanism;

FIGURE 2 is a section taken along line 2—2 of FIGURE 1 wherein it shows an egg being fed from an egg washer or conveyor into an egg receiving unit;

FIGURE 3 is a section taken along line 3—3 of FIGURE 1 showing the egg yolk and egg white cups positioned above troughs adapted to receive the contents thereof;

FIGURE 4 is a view taken along line 4—4 of FIGURE 1 showing the interconnection between the vertically disposed conveyor system for the egg breaking heads and egg product receiving cups;

FIGURE 5 is a view showing the egg retained in the egg holding device after the knife has been actuated to cut the egg shell; and FIGURE 6 is a view showing the egg holding device being brushed or swept clean.

Referring first to FIGURE 1, there is illustrated the exit end of a washer or conveyor 10 wherein the shell eggs 11 to be broken and the contents separated have been washed and candled. The eggs 11 are located on a diverger 12, which spaces the eggs so that they will be accurately dispensed into egg receiving cups 13 of the egg receiving units generally designated 14.

The diverger 12 includes a plurality of rows of rollers 16 located on parallel roller shafts 18. The rollers are suitably spaced in a longitudinal direction to support eggs 11 therebetween (see FIGURE 2). The shafts 18 are connected to a chain 22 that is driven by a sprocket 24 secured to shaft 26. The shaft is driven by a motor (not shown) through the action of a Geneva drive mechanism (not shown) so as to intermittently operate the diverger 12 to move a group of eggs 11 from the diverger into the egg cups of the egg receiving units at the time that a group of the units is in position to receive the eggs. Details of the egg diverger unit and drive mechanism therefor, which form no part of the present invention, are illustrated in my application entitled "Method and Apparatus for Feeding and Diverging Eggs Including Washing and Candling Facilities," Ser. No. 407,002, filed Oct. 28, 1964.

The egg receiving cups 13 are each adapted to receive an egg from the diverger and to support it in the position shown in FIGURE 2. The egg receiving cups 13 are generally U-shaped and have a front wall 13a diverging outwardly, thus enabling the cups to receive and retain eggs of varied sizes and shapes therein. It can be appreciated that the smaller eggs will move toward the bottom of the units, whereas the larger eggs will stay closer to the top. The cups 13 are made in two halves 30, 32, each half of which is shaped as indicated in FIGURE 2. As will be described hereinafter, the cup halves are separated after the egg shell has been cut to empty the egg contents into egg yolk and white receiving cups disposed therebelow.

The inner portion of each cup half is secured to a link 34 of a chain 36 and thus the position of each egg cup is accurately maintained throughout the movement of the chain of which the link is a part. A "quick-disconnect" means can be interposed between cup half and link to provide for uncoupling of the cup if desired. The chain 36 is moved by a power-operated sprocket 38, which is in turn driven through a chain 40 by a motor 42. The sprocket 38 is designed so that when the chain is moved thereabout, adjacent links 34 are angularly disposed and thus the cup halves 30, 32 are separated much like the opening of a book so that the eggs 11 disposed therein, when cut, will empty their contents into egg yolk and egg white receiving cups disposed therebelow. The conveyor system containing the egg product receiving cups will be discussed in detail hereinafter.

The shells of the eggs 11 received in the egg units 14 are cracked by knife halves 44, 46 positioned between the cup halves and secured thereto at the upper portion of the cup wall 13a. The knife halves, by being secured to the front wall 13a and not beneath the cup, are not in the path of the egg products being dumped from the egg. This eliminates loss of egg product due to it being trapped by the knife and minimizes contamination of the knife, which would make cleaning more difficult. The knife halves 44, 46 are normally retained out of engagement with the egg disposed in its respective egg cup by a cam 48, which is positioned to engage the upper ends 44a, 46a of the knife above the pivot pins 50 by which the knives are secured to the cups. The pins 50 are disposed in brackets 52 secured to the upper portion of the cup walls 13a. The knife halves are normally biased into cutting engagement with the egg located in the egg cup by tension springs 54 which are secured at one end to the lower end of an egg cup half and its other end to the end of the knife half adjacent the bottom of the cup half. Thus, when the knife halves are moved out of engagement with the cam 48, the springs will snap the knife halves into contact with the egg shell, thus cracking the same. The knife, when in the shell cutting position, is disposed substantially parallel to the wall 13a and thus will penetrate all eggs located in the cup (regardless of size) substantially the same amount. The depth of cut of the knife is controlled by a stop 49 secured to each knife half which engages the cup wall 13a. Specifically, as illustrated in FIGURE 2, the knife halves 44, 46 will move in a clockwise direction when they are moved out of contact with the cam 48.

As best seen in FIGURE 1, when the chain 36 is moved about the sprocket 38, the links 34 and thus the cup halves 30, 32 are separated with the result that the cracked egg is opened up and separated, which leaves the contents free to flow out of the egg into egg yolk and egg white receiving cups disposed therebelow. It is to be noted that each knife half, in conjunction with the front and rear wall of each egg cup half, serves to positively retain the egg shell in the egg cup half, thus preventing shell fragments, or the shell itself, from falling out of the egg holding units, which could contaminate the egg products being collected. Furthermore, as briefly referred to above, the knife being secured to the front wall 13a is out of the way of the egg products being dumped and thus will not trap any egg product.

After the egg products have been dumped from the egg shell, the egg receiving units are moved to subsequent stations, where the shells are removed from the egg holding units 14 and the egg units are cleaned. As seen in FIGURE 1, a cam 56 is positioned above a shell chute 58, which cam 56 is similar to cam 48 and acts to retract the knife halves 44, 46 into the position shown in FIGURE 2, which enables the shells to be forced out of the egg cup into the shell chute 58. After the knife halves have been retracted, the egg receiving units are moved through a brushing station 60, where the shells are brushed or paddled from the egg holding units into the shell chute. Air may also be used to shoot the shells down and out quickly after they are brushed out of the cup halves. This can best be seen by referring to FIGURE 6, which shows a brush 62 positioned within the egg cup to remove the egg shells therefrom.

After the shells have been removed, the egg receiving units are moved by the power driven conveyor through a washing station 64, where a spray 66 is introduced to wash away any residue which may remain in the egg receiving units. Following this, the egg receiving units are moved past a dryer 68 where the units are dried. The units are then in condition to receive additional eggs, and accordingly they are moved into position adjacent the egg feeder and diverger, where they again receive a new load of eggs.

Having now described the egg breaking arrangement, attention is directed to the mechanism for receiving, separating, and collecting the egg products emptied from the egg shells. As previously mentioned, there is a second conveyor system, the movement of which is synchronized with the conveyor system to which the egg receiving units are connected, which second conveyor system 70, for at least a portion of its travel, is located immediately below the egg receiving units to collect the egg contents dumped from the egg receiving units. This conveyor has secured to spaced links 72 of chain 73 an assembly 74, each comprising an egg yolk and egg white receiving cups 76, 78, respectively. The assemblies 74 are spaced apart the same distance as the egg holding units and thus, when the movements of the vertically spaced conveyors are suitably synchronized, the yolk and white cups will be properly positioned to receive the egg contents. The conveyor 70 is driven by the same mechanism that drives the egg receiving units conveyor system, and, as shown in FIGURE 4, consists of a sprocket 80 that is connected to the same shaft 82 to which sprocket 38 is connected.

Referring specifically to FIGURE 4, the egg cup assembly 74 is shown consisting of an egg yolk cup 76 connected to the upper part of the assembly immediately below the egg receiving unit, so that the contents of the egg being emptied will fall first into the egg yolk cup and the egg white will fall past the egg yolk cup into the larger egg white cup 78 disposed immediately therebelow. A suitable clipping mechanism 84 can be employed to provide better separation of the egg white from the egg yolk. Various types of clipping mechanisms and designs of egg yolk and egg white cups could be employed and further details of such mechanisms can be seen by referring to Shelton et al. Patent 3,133,569, issued May 19, 1964, and assigned to the assignee of the present invention. It is to be noted, however, that the egg cups 76, 78 are suitably mounted so their contents can be dumped into containers situated to collect same.

The conveyor system 70 containing the egg yolk and egg white cups, as illustrated in the drawings, is substantially rectangular in outline and moves past a plurality of stations, where various operations take place. While shown as being rectangular, it could obviously be triangular, or some other suitable configuration. Specifically, the chain 73 is defined by idler sprockets 85, 87 and a sprocket disposed below sprocket 39 about which chain 36 extends. The first station past which the conveyor moves is a selector station 86 wherein an operator, after viewing the egg products, decides where the particular egg white and egg yolk located in the cups passing the selector station is to be subsequently dumped. Depending on the condition of the product in the egg cups, the egg yolk and egg white will be programmed to empty into various receptacles suitably placed along the path of the conveyor. In FIGURE 2, there are shown a couple of troughs 89, 91 which are positioned to receive the contents from the egg yolk and egg white cups when they are to be dumped into preselected containers. In FIGURE 3, there are schematically illustrated mechanisms 88 which function to dump these cups at the preselected stations. Various mechanisms which can be employed for cutting and selectively dumping the egg white and egg yolk cups are disclosed in Shelton et al. Patent 3,142,322, issued July 28, 1964, entitled "Machine for Processing Eggs and Egg Products," which is assigned to the assignee of the present invention.

As can be appreciated, it is desired to prevent commingling of inedible and edible products and thus suitable provisions must be made to clean the egg cups after the products contained therein have been dumped. To this end, there is provided a spray unit 90, which washes the cups, and a drying unit 92 which subsequently dries them to condition them for receiving other egg products.

The method of operation of the apparatus described in detail here above is as follows:

The eggs 11 are moved from the washer 10 onto the diverger 12 from where they are dropped onto the egg receiving units 14, which are timed to be positioned adjacent the rollers 16 of the diverger when the diverger is moved to dispose a plurality of eggs into the egg receiving units. The eggs 11 are received in the cups 13 with portions of each egg being disposed in the cup halves 30, 32 of the egg receiving cup 13. The knife halves 44, 46 are retained out of engagement with the eggs in the egg cups until the egg cups pass the end of cam 48. When the knives are moved out of engagement with the end of cam 48, the springs 54 snap the knives into the space between the cup halves and sever the egg shell. Immediately subsequent thereto, the chain 36, to which the cup halves are secured through links 34, is moved about sprocket 38, at which time the cup halves 30, 32 are separated. When the cup halves are separated, the contents therein fall onto the egg cup assembly disposed immediately therebelow. The egg cup assembly is driven by a sprocket 80, which is interconnected to sprocket 38 by shaft 82 to synchronize movement of the chain 73 along with the chain 36 to accurately position the cup assembly below the egg receiving units. The egg falls into the yolk cup 76 and the egg white flows over the egg yolk cup into the egg white cup 78. Clipping mechanism 84 can then be actuated to further separate the egg white from the egg yolk. The upper conveyor, to which the egg receiving units are attached, continues to be driven by the motor 42 and it moves about sprockets 38, 39, and 41. After the egg contents have been dumped, the egg receiving units move past cam 56, which retracts the knife halves to permit the egg shells to be brushed out of the egg cup 13 by a brush 62. The egg shells are brushed into a shell chute 58. Further movement of the egg receiving units takes them past a washer 64 and drying mechanism 68, after which they are then moved into position to receive additional eggs from the diverger.

The lower conveyor system 70, consisting of the egg yolk and egg white cups, is driven by sprocket 80 around sprockets 85, 87, and a sprocket not shown disposed below upper conveyor sprocket 39. The cups are moved past a selector station 86, where the operator determines which of the receptacles are to receive the contents located in the egg cups. The egg cups are subsequently dumped and washed by washer 90 and dried by dryer 92. The cups are then moved into position below the egg receiving units, where the entire operation again takes place.

Although a preferred embodiment of the invention has been described in considerable detail, it will be understood that the description thereof is intended to be illustrative, rather than restrictive, as many details of construction may be modified or changed without departing from the true spirit or scope of the invention. Accordingly, it is not desired to be restricted to the exact details of structure described.

What is claimed is:

1. Apparatus for handling egg products comprising a first conveyor system including a chain made up of a plurality of link means, a second conveyor system disposed below said first conveyor system and including a chain having a plurality of link means, a plurality of spaced egg receiving units comprising egg cup halves connected to the link means of said first conveyor system for receiving eggs to be broken, a plurality of egg cup assemblies connected to the link means of said second conveyor system and spaced apart an amount equal to the spacing of said egg receiving units and adapted to receive the egg contents of said eggs in the egg receiving units, means for opening the eggs received in said egg receiving units including knife means secured to said egg cup halves and disposed therebetween, means for controlling the action of said knife means, means for driving and synchronizing the movement of said first and second conveyor systems, the drive means for said first conveyor system including a sprocket whereby when the chain is moved about said sprocket the cup halves of each egg receiving unit are separated to split the egg shell of the egg contained therein and dump the contents thereof into the egg assemblies disposed therebelow.

2. Apparatus as set forth in claim 1 in which the cup halves are essentially U-shaped in cross section and open at each end and are thus adapted to receive eggs of varying sizes, the knife means comprises knife halves that are connected to each of said cup halves, spring means biasing said knife means into engagement with the eggs disposed in said cup halves, and means for retaining said knife means out of engagement with the egg in the egg receiving unit until such time as the egg has been properly positioned in said egg receiving units.

3. Apparatus as set forth in claim 1 including means for moving said knife means out of engagement with said eggs in the egg receiving units, means for brushing said egg shells out of said egg cup halves, means for collecting said egg shells, and means for cleaning said egg receiving units to condition said units to receive subsequent eggs.

4. Apparatus as set forth in claim 1 including means for selectively controlling the dumping of the egg products received by the egg cup assemblies connected to said second conveyor systems, means for dumping said egg products, and means for cleaning said egg cup assemblies to condition them for receiving subsequent egg products.

5. Apparatus as set forth in claim 1 including a common drive means for driving said first and second conveyor systems, means for feeding eggs to said egg receiving units, and means for synchronizing the operation of said feeding means and first conveyor system to insure proper feeding of eggs from the feeder to the egg cup halves designed to receive the eggs.

6. An egg cup assembly comprising a pair of generally U-shaped spaced egg cup halves designed to receive shell eggs, each cup half including a rear wall and an outwardly sloping front wall, knife means secured to the upper portion of said front wall portions and positioned to move into the space between said cup halves to cut the eggs disposed therein, means biasing said knife means into engagement with the eggs disposed in said cup halves, and means limiting the movement of said knife means to control the cutting action thereof.

7. An egg cup assembly as set forth in claim 6 wherein means are provided for pivotally connecting the knife means to said egg cup front wall portions and the means limiting the cutting movement of the knife means consists of interengaging means between the knife means and the front wall of the cup halves.

8. An egg cup assembly as set forth in claim 7 in which the means for biasing the knife means into engagement with the egg disposed in said egg cup halves consists of a tension spring secured at its ends to the front wall of the cup half and the knife means, said knife limiting means is so positioned that the knife means in its cutting position will be disposed substantially parallel to the front wall whereby the eggs disposed in said egg cup halves regardless of size will be cut substantially the same amount.

9. An egg cup assembly as set forth in claim 6 in which the egg cup halves when separated support the egg halves between the front and rear walls of the cup halves and the knife means connected to the front wall, which knife means is out of the flow path of the egg products being dumped from the eggs and thus will not trap any egg products in the egg shell.

10. An egg receiving unit comprising a plurality of egg cup halves which are generally U-shaped and include a front wall which diverges outwardly from the rear wall to accommodate eggs of varying sizes, knife means pivotally connected to said egg cup halves and positioned to sever the egg shell disposed in said egg cup halves, said knife means includes a pair of knife halves each secured to one of said egg cup halves, means for biasing said knife means into the space between said egg cup halves including spring means secured at one end to an egg cup half and at its other end to its corresponding knife half and means for retaining said knife means out of engagement with an egg disposed in said egg cup halves.

References Cited
UNITED STATES PATENTS

| | | | |
|---|---|---|---|
| 2,524,844 | 10/1950 | Smith | 146—2 |
| 2,966,184 | 12/1960 | Willsey | 146—2 |
| 3,133,569 | 5/1964 | Shelton et al. | 146—2 |

W. GRAYDON ABERCROMBIE, *Primary Examiner.*